(12) United States Patent
Bae et al.

(10) Patent No.: US 6,402,694 B1
(45) Date of Patent: Jun. 11, 2002

(54) COLOR IMAGING DISPLAY METHOD AND APPARATUS FOR COLOR DOPPLER IMAGING SYSTEM

(75) Inventors: Moo Ho Bae; Ki Jong Lee, both of Seoul (KR)

(73) Assignee: Medison Co., Ltd. (KR)

( * ) Notice: Subject to any disclaimer, the term of this patent is extended or adjusted under 35 U.S.C. 154(b) by 0 days.

(21) Appl. No.: 09/565,141

(22) Filed: May 5, 2000

(30) Foreign Application Priority Data

May 6, 1999 (KR) ............................................. 99-16161

(51) Int. Cl.[7] ................................................. A61B 8/02
(52) U.S. Cl. ..................................................... 600/453
(58) Field of Search ......................... 600/437, 440–447, 600/453–458, 465; 73/861.25, 625, 626; 382/6

(56) References Cited

U.S. PATENT DOCUMENTS 5,152,292 A * 10/1992 Karp ........................... 600/454
5,329,929 A * 7/1994 Sato et al. ................... 600/441
5,860,930 A * 1/1999 Guracar ...................... 600/455

* cited by examiner

Primary Examiner—Francis J. Jaworski
Assistant Examiner—Ali M. Imam
(74) Attorney, Agent, or Firm—Bourque & Associates, P.A.

(57) ABSTRACT

A color imaging display method and apparatus in a color doppler imaging system can display a high quality of a color image in which a flash artifact which is a kind of a clutter signal is removed. The method and apparatus determines whether the flash artifact exists, according to the result obtained by frequency-estimating a doppler signal where an ultrasonic signal is filtered and a clutter signal where the ultrasonic signal is not filtered, and mixing the information obtained through the frequency estimation, and determines whether or not a corresponding pixel is displayed in an ultrasonic color doppler image. Thus, the pixel which has been determined as the flash artifact is not displayed, to thereby obtain a high quality of a color image.

20 Claims, 4 Drawing Sheets

COLOR IMAGING DISPLAY METHOD AND APPARATUS FOR COLOR DOPPLER IMAGING SYSTEM

BACKGROUND OF THE INVENTION

1. Field of the Invention

The present invention relates to an ultrasonic color Doppler imaging system, and more particularly, to a color imaging display method and apparatus which can display a high quality of a color image in which a flash artifact which is a kind of a clutter signal included in an ultrasonic signal is effectively removed.

2. Description of the Related Art

A general ultrasonic testing apparatus emits an ultrasonic signal to an object to be tested, receives an ultrasonic signal reflected and returned from a discontinuous surface of the object, and then converts the received ultrasonic signal into an electrical signal and outputs the electrical signal to an imaging apparatus, in order to test the internal state of the object. The ultrasonic testing apparatus is widely used for medical diagnosis, non-destructive testing and underwater photographic search.

A Doppler diagnostic apparatus which is a kind of a diagnostic apparatus adopting an ultrasonic signal displays a frequency shift amount together with a signal scattering intensity as an image, to thereby estimate the dynamic functions in the living body. In particular, a color doppler imaging system which can display a color ultrasonic image demodulates a received signal and then digitizes the received signal to process it in digital form, thereby displaying a blood stream flowing in the heart or main blood vessel as a two-dimensional image in real-time. Such a color doppler imaging system can display a tomographic image and blood stream information at the same time, in which the tomographic image is displayed in black and white and the blood stream information is displayed in color, in order to discern the tomographic image and the blood stream information from each other. In this case, a blood stream flowing in the proceeding direction of a scanned ultrasonic beam is displayed as a warm color of red color series and the other blood stream flowing in the opposing direction to the scanned ultrasonic beam proceeding direction is displayed as a cool color of blue color series, in order to display the information on the blood stream with more accuracy.

Meanwhile, the doppler signal demodulated by the above color doppler imaging system contains a low-frequency doppler signal due to movement of the cardiac wall or the tissue of the human body. The low-frequency doppler signal that is called a clutter signal impedes an accurate detection of the blood stream information. Thus, to accurately detect the blood stream information, the clutter signal should be properly removed. The clutter signal due to the cardiac wall or tissue movement contains a very high-level component in general, and has several hundred times an amplitude as large as that of the doppler signal based on the blood stream. The large clutter signal appears frequently when the human tissue moves severely as in the case of the movement of the blood vessel wall or the heart pulse, or when the patient breathes during diagnosis or the doctor moves a probe for diagnosis. The pixels including the clutter signal look like as if a color box is filled with a color image of a dim color representing a slow velocity. The clutter signal is called a flash artifact since it looks like a lightening in real-time image.

Various methods have been proposed in the conventional art in order to remove the flash artifact. First, there is a method of enhancing the cut-off frequency of a clutter filter. The cut-off frequency enhancement method can remove the flash artifact having a slightly fast velocity but cannot remove that having a largely fast velocity due to the limit of the filtering level based on the stop-band characteristic of an infinite impulse response (IIR) filter. Second, there is a method of adaptively varying a cut-off frequency of the clutter filter disclosed in U.S. Pat. No. 5,664,575 entitled "Ultrasonic Doppler Imager Having Adaptive Tissue Rejection Filter." This method can reduce the flash artifact if a cut-off frequency becomes high as in the above first method. However, this method has a demerit in which useful doppler information disappears. Third, there is a method of using an inter-image frame filter disclosed in U.S. Pat. No. 5,722,412 entitled "Hand Held Ultrasonic Diagnostic Instrument." This method uses a min-max filter and a non-linear filter according to the relationship of a successively calculated color framing and can remove the flash artifact irrespective of the velocity and power of the flash artifact. However, the frame which has been displayed for non-linear filtering between successive frames is delayed in comparison with an actually scanned frame.

SUMMARY OF THE INVENTION

To solve the above problems, it is an object of the present invention to provide a method and apparatus for displaying a high quality of color image in a color doppler imaging system, in which a doppler signal where an ultrasonic signal is filtered and a clutter signal where the ultrasonic signal is not filtered are frequency-estimated, and information obtained through the frequency estimation is mixed in order to remove flash artifact.

To accomplish the above object of the present invention, there is provided a method of displaying a color image in a color doppler imaging system, the color image displaying method comprising the acts of: (a) filtering a clutter signal from an ultrasonic signal reflected from an object; (b) analyzing a respective frequency spectrum of the ultrasonic signal and an ultrasonic doppler signal filtered in act (a), to thereby calculate clutter information and doppler information; (c) determining whether a flash artifact exists based on the clutter information and the doppler information calculated in act (b); and (d) determining whether a color image of a corresponding pixel is displayed according to the determination result of act (c).

According to the other aspect of the present invention, there is provided a color image displaying apparatus for displaying a color image for removing a flash artifact in a color doppler imaging system, the color image displaying apparatus comprising: a clutter filter for filtering an ultrasonic signal reflected from an object and outputting a doppler signal obtained by removing a clutter signal from the ultrasonic signal; a post processor for analyzing a respective frequency spectrum with respect to input and output signals of the clutter filter, determining whether a flash artifact exists using information obtained from the analyzed result, and outputting pixel display information in such a manner that a pixel to be determined as the flash artifact is not displayed; and a display for displaying an ultrasonic color doppler image according to the pixel display information of the post processor.

BRIEF DESCRIPTION OF THE DRAWINGS

The above object and other advantages of the present invention will become more apparent by describing the preferred embodiment thereof in more detail with reference to the accompanying drawings in which.

DETAILED DESCRIPTION OF THE PREFERRED EMBODIMENT

A preferred embodiment of the present invention will be described with reference to the accompanying drawings.

In the present invention, the characteristic of the clutter signal is used to remove a flash artifact, which will be simply described first.

The clutter signal exists within 0.1×PRF based on a pulse repetition frequency (PRF) to be observed. That is, a doppler signal is represented as various colors, but a clutter signal is represented as a color corresponding to a low velocity, of which the range is very narrow. Thus, it can be seen that the velocity of the clutter signal is lower than that of the doppler signal. Also, the power of the clutter signal is larger than that of the doppler signal. That is, the power of the clutter signal is 10 to 100 times as large as that of the doppler signal. In particular, since the power of the flash artifact is 100 times or more as large as the doppler signal, the flash artifact is not well removed by the clutter filter. In the present invention, it is assumed that although the flash artifact passes through the clutter filter, the power of the flash artifact will be larger than that of the doppler signal. The reason resides in the fact that all pixels on a screen are represented as a single color of a low velocity irrespective of existence or non-existence of the doppler signal when the flash artifact exists. That is, the average velocity of the pixel calculated for the color doppler image is close to that of the clutter signal, whose reason is because the power of the clutter signal having passed through the clutter filter is very large. Also, the clutter signal has a relatively smaller variance than that of the doppler signal. In other words, it means that the spectrum of the signal is placed within the narrow range.

Figure 1A:
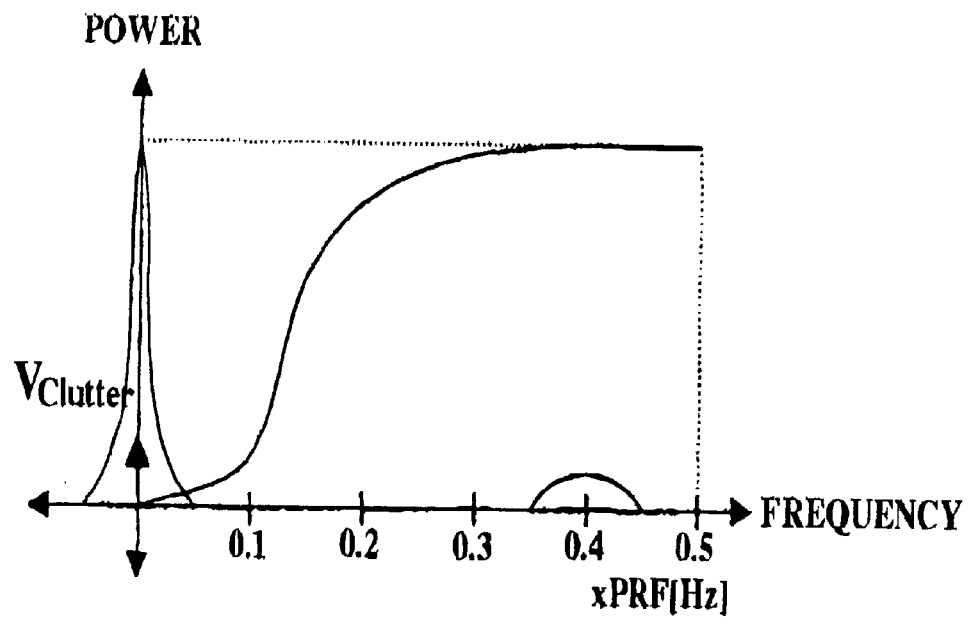
FIGS. 1A and 1B are graphical views showing a signal power of before and after clutter filtering when the velocity of a clutter signal reaches zero, respectively.
Figure 3A:
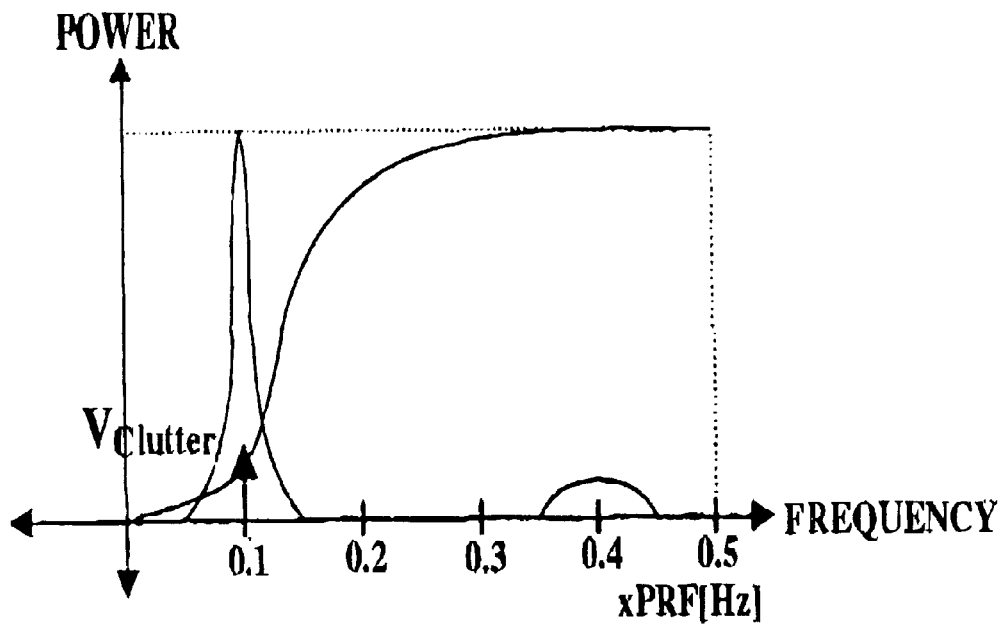
FIGS. 3A and 3B are graphical views showing a signal power of before and after clutter filtering when the velocity of a clutter signal is 0.01×PRF, respectively.
Figure 3B:
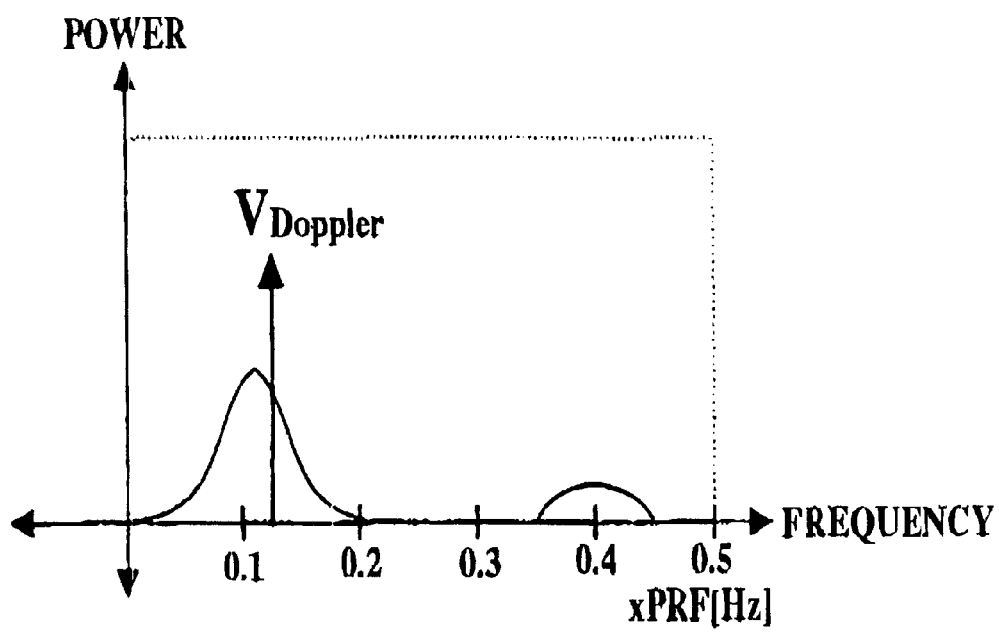

FIGS. 1A through 3B are views for explaining the characteristics of the above-described clutter filter. In the drawings, the horizontal axes represent the frequencies and the vertical axes represent the powers. FIGS. 1A and 1B are graphical views showing a signal power of before and after clutter filtering when the velocity of a clutter signal reaches zero, respectively. FIGS. 2A and 2B are graphical views showing a signal power of before and after clutter filtering when the velocity of a clutter signal is 0.05×PRF, respectively. FIGS. 3A and 3B are graphical views showing a signal power of before and after clutter filtering when the velocity of a clutter signal is 0.01×PRF, respectively.

Figure 1B:
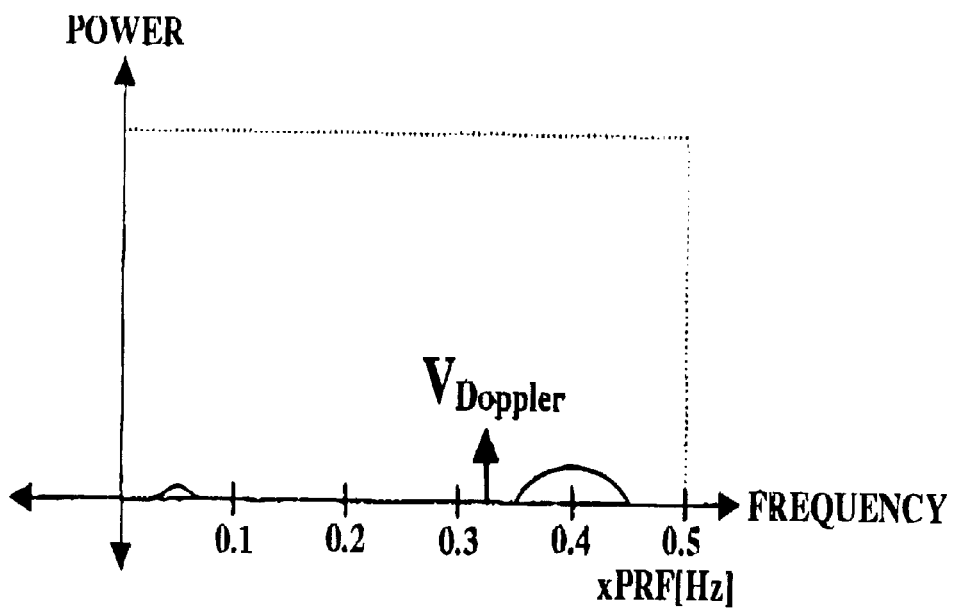
Figure 2A:
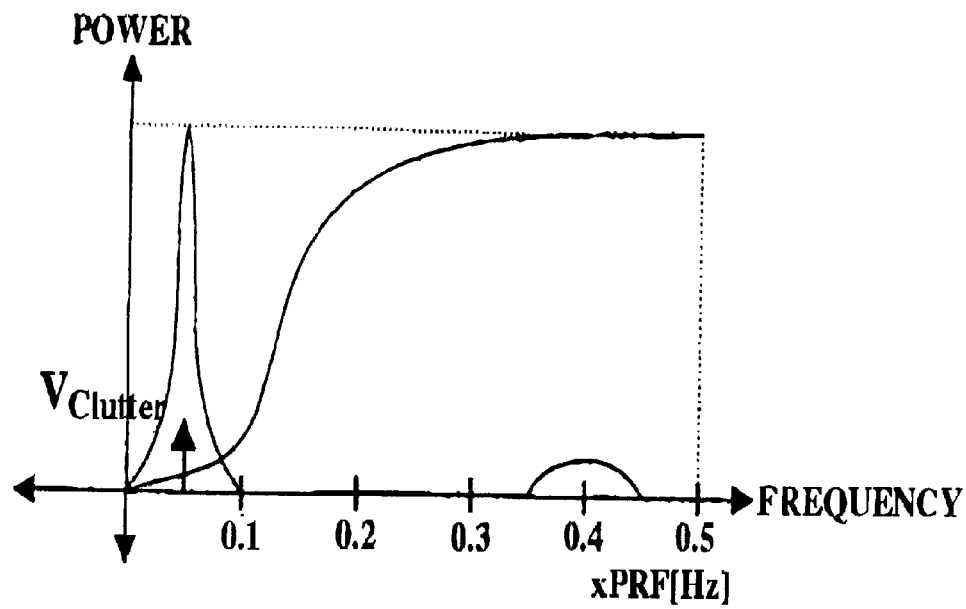
FIGS. 2A and 2B. are graphical views showing a signal power of before and after clutter filtering when the velocity of. a clutter signal is 0.05×PRF, respectively.
Figure 2B:
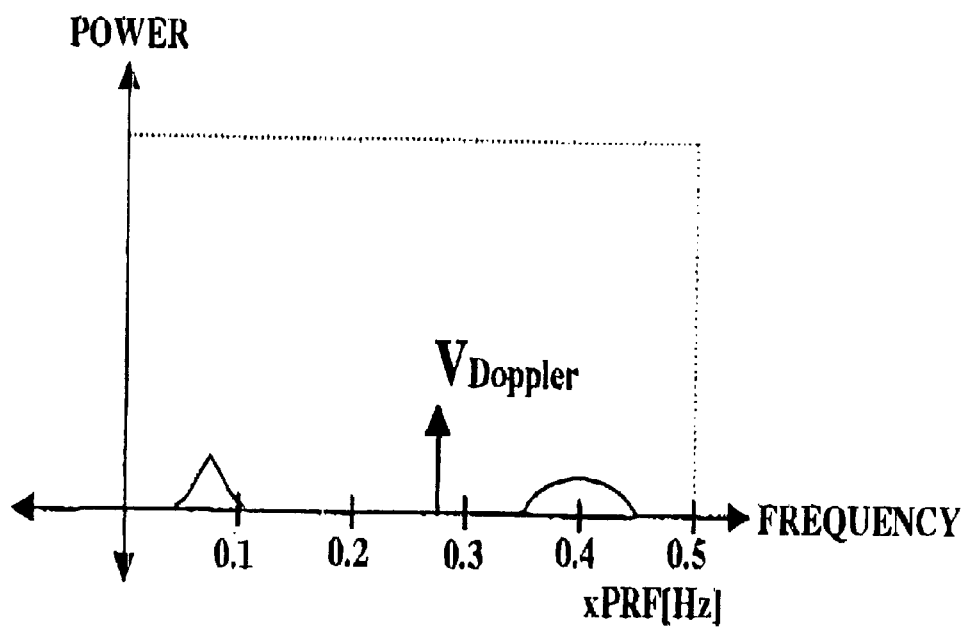

In the case that the average velocity $V_{Clutter}$ of the clutter signal is small (see FIG. 1A), the average velocity $V_{Doppler}$ of the doppler signal of after filtering is close to that of the doppler signal (see FIG. 1B). However, in the case that the velocity and the power of the clutter signal is large (see FIG. 3A), the average velocity, the power and the variance of the doppler signal which is the result of after clutter filtering are close to those of the clutter signal (see FIG. 3B). Thus, it can be seen that the amount of the clutter signal which remains after having passed through the clutter filter can influence upon the estimation of the average velocity, the power and variance of the doppler signal.

The present invention proposes a method and apparatus for removing a flash artifact by use of the characteristic of the flash artifact.

Figure 4:
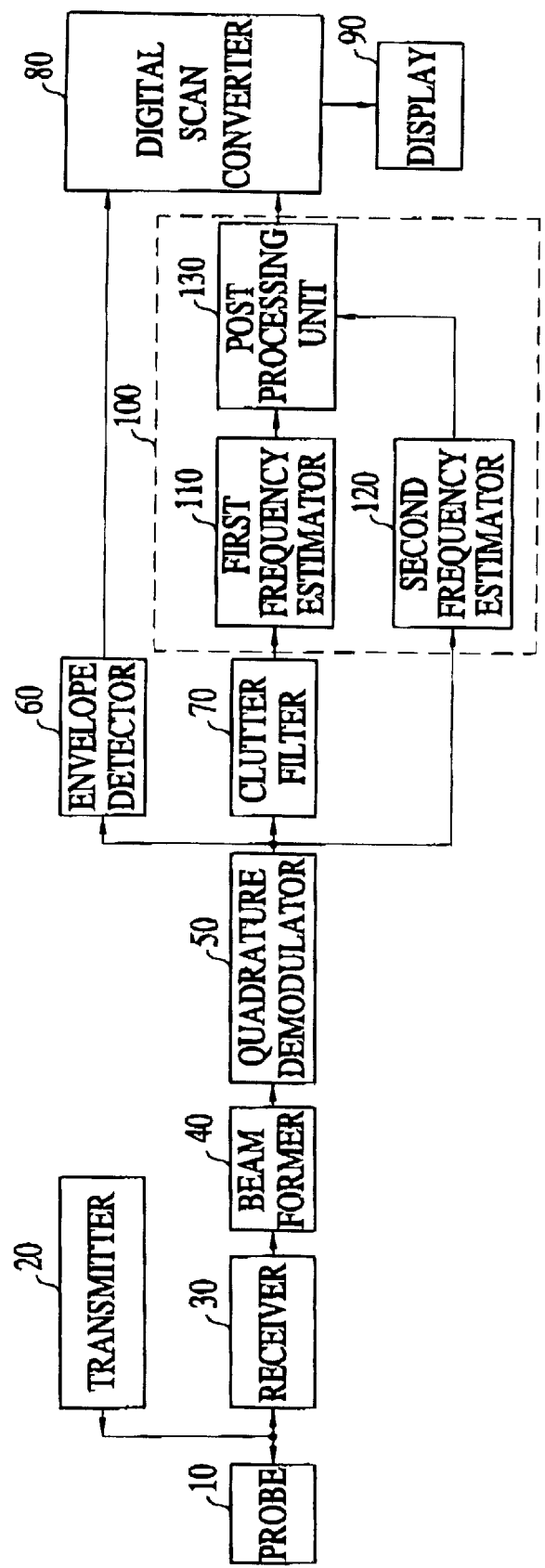
FIG. 4 is a block diagram showing an ultrasonic color doppler imaging system according to the present invention.

FIG. 4 is a block diagram showing a color doppler imaging system according to a preferred embodiment of the present invention. The system shown in FIG. 4 includes all blocks of a general color doppler imaging system, in which a post processor 100 of the present invention is included between a clutter filter 70 and a digital scan converter (DSC) 80. As a result, a pixel corresponding to the flash artifact is not displayed on a screen. The post processor 100 includes first and second frequency estimators 110 and 120 for estimating a respective frequency spectrum with respect to input and output signals of a clutter filter 70, and a post processing unit 130 for determining whether a flash artifact exists based on the information obtained from the estimated results of the first and second frequency estimators 110 and 120 and outputting the determined result to a digital scan converter (DSC) 80. The operation of removing the flash artifact of the color doppler image and displaying the flash artifact removed color doppler image in the color doppler imaging system having the above structure will be described in detail with reference to FIG. 4.

A probe 10 includes a plurality of ultrasonic oscillators, in which the pulse voltage of a transmitter 20 is converted into an ultrasonic signal, the converted result is transmitted in the living body, and the echo signal reflected from the living body is converted into an electrical signal. A receiver 30 receives an ultrasonic echo signal from each oscillator of the probe 10, amplifies the received signal into a predetermined power, and outputs the amplified result to a beam former 40. The beam former 40 time-delays the ultrasonic echo signal of each oscillator of which the power has been amplified, differently from each other, and then sums all the time-delayed results, to thereby perform a receive focusing operation. An quadrature demodulator 50 receives a receive signal focused by the beam former 40 and converts the received signal into a complex number, to thereby detect a phase variation amount with respect to a repetition period of a transmit pulse. That is, the quadrature demodulator 50 detects the phase of the receive signal at every sampling point. The complex number signal converted by the quadrature demodulator 50 is input to an envelope detector 60, a clutter filter 70 and a second frequency estimator 120 of the post processor 100. The envelope detector 60 performs envelope detection with the input complex number signal, for display of the black and white image and transfers the result to the DSC 80. The clutter filter 70 filters the input complex number signal to remove the clutter signal and outputs the clutter signal removed doppler signal to the first frequency estimator 110 of the post processor 100. The first frequency estimator 110 estimates the frequency spectrum with respect to the doppler signal from which the input clutter signal has been removed and extracts doppler information. The second frequency estimator 120 estimates the frequency spectrum with respect to the input complex number signal, that is, the clutter signal of the not-yet-filtered ultrasonic signal, and extracts clutter information. Here, the frequency spectrum is estimated using an autocorrelation method. In general, a color doppler image mode does not display the autocorrelation result directly but converts the autocorrelation result into the power, average velocity and variance of the blood stream and passes through a mapping process for mapping the converted results into colors, to thereby display the result on a screen. The conversion of the autocorrelation result into the power, average velocity and variance is defined as the following equations.

$$\text{Power} = \sqrt{R(0)} \quad (1)$$

$$\text{Velocity} = \tan^{-1}(Im[R(0)]/R(1)) \quad (2)$$

$$\text{Variance} = \left| 1 - \frac{\sqrt{Re[R(1)]^2 + Im[R(1)]^2}}{R(0)} \right| \quad (3)$$

The first and second frequency estimators 110 and 120 obtain the information from the doppler signal and the clutter signal, that is, the power, average velocity and variance, by use of the above equations (1) through (3), and output the obtained information to the post processing unit 130. The post processing unit 130 determines whether a flash artifact exists by use of the doppler information applied from the first frequency estimator 110 and the clutter information applied from the second frequency estimator 120. The post processing unit 130 determines whether a corresponding pixel will be displayed in or removed from a color doppler image according to the determination result. The algorithms for determining the flash artifact are as follows.

The first algorithm is based on the fact that the power of the clutter signal is relatively larger than that of the doppler signal. Thus, the post processing unit 130 determines whether the power of the clutter signal is larger than a predetermined reference power, among clutter information. If the post processing unit 130 determines that the power of the clutter signal is larger than the reference power, the post processing unit 130 estimates that the clutter signal would not be removed through clutter filtering and thus determines that the flash artifact exists. The post processing unit 130 outputs the pixel display information to the DSC 80 in order that the pixel which has been determined that the flash artifact exists is removed from the color doppler image.

The second algorithm is based on the fact that the variance of the clutter signal is relatively smaller than that of the doppler signal. Thus, the post processing unit 130 determines whether the difference between the variance of the clutter signal and that of the doppler signal is larger than a predetermined reference value. If the difference in the variances between the two signals is larger than the reference value, the post processing unit 130 determines that the influence of the clutter signal is large, in order that a corresponding pixel is not displayed in the color doppler image.

The third algorithm is based on the fact that the average velocity of the clutter signal is relatively slower than that of the doppler signal. Thus, the post processing unit 130 determines whether the difference between the average velocity of the clutter signal and that of the doppler signal is smaller than a predetermined value. If the difference in the average velocities between the two signals is smaller than the predetermined value, the post processing unit 130 determines that the estimation of the average velocity is wrong due to the influence of the clutter signal, in such a manner that a corresponding pixel is not displayed in the color doppler image. However, if the average velocity of the clutter signal is larger than the predetermined reference velocity, even if the difference in the average velocities of the two signals is smaller than the predetermined value, the post processing unit 130 determines that no clutter signal exists in the corresponding pixel, in such a manner that the corresponding pixel is displayed in the color doppler image.

The post processing unit 130 uses the above three algorithms individually or sequentially with priority. A comparison method in each algorithm is determined using an "if-then-else" method or is determined constructing rules with respect to various conditions using a fuzzy logic. In the case that the fuzzy logic is used, a freedom degree of selection is enhanced to thereby perform an effective determination.

The DSC 80 receives the pixel display information from the post processing unit 130 and controls a display 90 so that a corresponding pixel is displayed or not displayed for matching of direction of the TV scanning line. The display 90 displays the flash artifact removed ultrasonic color doppler image under the control of the DSC 80.

As described above, the color image display method and apparatus for use in the color doppler imaging system determines whether the flash artifact exists with respect to the result obtained by mixing the doppler information obtained by having passed through the clutter filter and the clutter information obtained by having not passed through the clutter filter. By doing so, the pixel from which it is determined that the flash artifact exists is not displayed on the screen, thereby providing an effect of displaying a high quality of color image from which the flash artifact has been removed.

What is claimed is:

1. A method of displaying a color image in a color Doppler imaging system, the color image displaying method comprising the acts of:
    (a) filtering E clutter signal from an ultrasonic signal reflected from an object;
    (b) analyzing a respective frequency spectrum of the non filtered ultrasonic signal and an ultrasonic Doppler signal filtered in act (a), to thereby calculate clutter information and Doppler information;
    (c) determining whether a flash artifact exists based on the clutter information and the Doppler information calculated in act (b);
    (d) outputting pixel display information in such a manner that a corresponding pixel is not displayed if it has been determined that the flash artifact exists and the corresponding pixel is displayed if it has been determined that no flash artifact exists in act (c); and
    (e) displaying an ultrasonic color Doppler image according to the pixel display information of act (d).

2. The color image displaying method according to claim 1, wherein the frequency spectrum is estimated via autocorrelation in said act (b).

3. The color image displaying method according to claim 1, wherein said clutter information is the average velocity, power and variance of the clutter signal included in the non-filtered ultrasonic signal.

4. The color image displaying method according to claim 3, wherein said doppler information is the average velocity, power and variance of the filtered ultrasonic doppler signal.

5. The color image displaying method according to claim 4, wherein the existence of the flash artifact is determined based on the characteristic that the clutter signal is slower than the doppler signal in velocity, the former is larger than the latter in power, and the former is smaller than the latter in variance, in said act (c).

6. The color image displaying method according to claim 5, wherein the existence of the flash artifact is determined in said act (c), via the following algorithms:
    a first algorithm for comparing the power of the clutter signal with a predetermined power among the calculated clutter information and determining that the flash artifact exists if the former is larger than the latter;
    a second algorithm for comparing the difference in the average velocities between the average velocity of the clutter signal and that of the doppler signal with a predetermined value among the calculated clutter information and doppler information and determining that the flash artifact exists if the former is smaller than the latter; and a third algorithm for comparing the difference in the variances between the variance of the clutter signal and that of the doppler signal with a predetermined value among the calculated clutter information and doppler information and determining that the flash artifact exists if the former is larger than the latter.

7. The color image displaying method according to claim 6, wherein said algorithms are individually applied in said act (c).

8. The color image displaying method according to claim 6, wherein said algorithms are sequentially applied with priority in said act (c).

9. The color image displaying method according to claim 8, wherein a fuzzy logic is used when said algorithms are sequentially applied in said act (c).

10. The color image displaying method according to claim 6, wherein it is determined in said act (c) that no flash artifact exists if the difference in the average velocities of the two signals is less than the predetermined value and the average velocity of the clutter signal is larger than the predetermined velocity during performing the second algorithm.

11. A color image displaying apparatus for removing a flash artifact and displaying a color image in a color Doppler imaging system, the color image displaying apparatus comprising:

a clutter filter for filtering an ultrasonic signal reflected from an object arid outputting a Doppler signal obtained by removing a clutter signal from the ultrasonic signal;

a first frequency estimator for estimating the frequency spectrum of the Doppler signal obtained by removing the clutter signal filtered in said clutter filler and calculating Doppler information;

a second frequency estimator for estimating the frequency spectrum of the clutter signal included in the non-filtered ultrasonic signal and calculating clutter information;

a post processing unit for determining the flash artifact exists based on the calculated Doppler information and clutter information, and outputting pixel display information in such a manner that a corresponding pixel is not displayed if it has been determined that the flash artifact exists and the corresponding pixel is displayed if it has been determined that no flash artifact exists; and a display for displaying an ultrasonic color Doppler image according to the pixel display information of said post processing unit.

12. The color image displaying apparatus according to claim 11, wherein said first frequency estimator estimates the frequency spectrum of the doppler signal using autocorrelation.

13. The color image displaying apparatus according to claim 12, wherein said doppler information is the power, the average velocity and variance of the doppler signal.

14. The color image displaying apparatus according to claim 13, wherein said second frequency estimator estimates the frequency spectrum of the clutter signal included in the ultrasonic signal using autocorrelation.

15. The color image displaying apparatus according to claim 14, wherein said clutter information is the power, the average velocity and variance of the clutter signal.

16. The color image displaying apparatus according to claim 15, wherein said post processing unit determines that the flash artifact exists if the power of the clutter signal is larger than the predetermined power, and outputs the pixel display information in such a manner that a corresponding pixel is not displayed.

17. The color image displaying apparatus according to claim 15, wherein said post processing unit determines that the flash artifact exists if the difference in the variances of the clutter signal and the doppler signal is larger than the predetermined value, and outputs the pixel display information in such a manner that a corresponding pixel is not displayed.

18. The color image displaying apparatus according to claim 15, wherein said post processing unit determines that the flash artifact exists if the difference in the average velocities of the clutter signal and the doppler signal is less than the predetermined value, and outputs the pixel display information in such a manner that a corresponding pixel is not displayed.

19. The color image displaying apparatus according to claim 18, wherein said post processing unit determines that no clutter signal exists in the corresponding pixel if the average velocity of the clutter signal is faster than the predetermined velocity, even if the difference in the average velocities of the clutter signal and the doppler signal is less than the predetermined value, and outputs the pixel display information in such a manner that the corresponding pixel is displayed.

20. A method of displaying a color image in a color doppler imaging system, the color image displaying method comprising the acts of:

(a) filtering a clutter signal from an ultrasonic signal reflected from an object;

(b) analyzing a respective frequency spectrum of the ultrasonic signal and an ultrasonic doppler signal filtered in act (a), to thereby calculate clutter information and doppler information;

(a) determining whether a flash artifact exists based on the clutter information and the doppler information calculated in act (b), wherein the existence of the flash artifact is determined via the following algorithms:

a first algorithm for comparing the power of the clutter signal with a predetermined power among the calculated clutter information and determining that the flash artifact exists if the former is larger than the latter;

a second algorithm for comparing the difference in the average velocities between the average velocity of the clutter signal and that of the doppler signal with a predetermined value among the calculated clutter information and doppler information and determining that the flash artifact exists if the former is smaller than the latter; and a third algorithm for comparing the difference in the variances between the variance of the clutter signal and that of the doppler signal with a predetermined value among the calculated clutter information and doppler information and determining that the flash artifact exists if the former is larger than the latter; and (d) determining whether a color image of a corresponding pixel is displayed according to the determination result of act (c).

* * * * *